Patented Mar. 31, 1942

2,278,374

UNITED STATES PATENT OFFICE 2,278,374

CONDENSATION PRODUCTS OF ALDEHYDES AND UREA DERIVATIVES

John Frank Olin, Grosse Ile, Mich., assignor to Sharples Chemicals Inc., a corporation of Delaware No Drawing. Application August 28, 1940, Serial No. 354,583

4 Claims. (Cl. 260—69)

The present invention pertains to chemical products formed by condensing urea derivatives with methylene-containing bodies, such as formaldehyde. This application is a continuation in part of my prior applications, Serial No. 164,525, filed September 18, 1937, and Serial No. 316,315, filed January 30, 1940.

It is a well-known fact that urea may be reacted with formaldehyde to produce resinous condensation products. This reaction may be greatly accelerated by the use of small amounts of acids as catalysts, and it may also be accelerated with the aid of alkaline catalysts. The condensation reaction, ordinarily occurs in two steps. In the first step, the urea reacts with formaldehyde to produce an initial reaction mixture which is liquid, and which contains dimethylol urea. When the dimethylol urea-containing reaction product is heated further to remove water and excess formaldehyde, polymerization takes place to form a hard, solid, resin.

Resins produced in the manner discussed above are valuable in commerce because of their pale color and transparency, and because of the fact that they may be molded into various useful shapes. Their utility is limited, however, because of the fact that they are not ordinarily soluble in organic solvents or in water. Because of their relative insolubility, their utility in coating compositions is limited. The utility of resins formed by condensing unsubstituted urea with formaldehyde is also somewhat limited by the brittleness of these resinous condensation products, and by the tendency of the resin constituents to undergo further undesired reactions even after they have been in use for a long time. These undesired reactions frequently result in the development of cracks and fissures in the finished products.

In the case of condensation of most of the higher alkyl substituted ureas, such as mono- and di-butyl urea, -amyl urea, -hexyl urea, -heptyl urea, etc., when these alkyl-substituted ureas are condensed with formaldehyde in accordance with the method discussed above, the condensation takes place in two successive steps, just as in the case of the condensation reaction between unsubstituted urea and formaldehyde. When these higher alkyl ureas are reacted with formaldehyde, however, the resulting condensation products are usually liquid, and in any case are softer than is desirable in connection with the uses to which urea-formaldehyde resins are ordinarily put.

The present invention rests upon the discovery of the fact that, when cyclohexyl urea is condensed with formaldehyde or its equivalent, condensation products are produced which can be hardened by heat, and have the necessary firmness to permit their use in molding compositions and for various other purposes where a solid resin is desired. A further advantage of such products as compared to the simple urea-formaldehyde resins consists in the fact that compounds produced by condensing cyclohexyl urea with formaldehyde and hardening the resulting condensation products by heat are soluble in the ordinary aromatic hydrocarbons and other organic solvents such as alcohols. Varnishes made from these resins have excellent air drying properties.

As an alternative to the production of solid resins by heating the condensation products of cyclohexyl urea and formaldehyde, the heat treatment may be terminated while the resulting condensation product is still a viscous liquid. Viscous liquids produced in this manner are useful as plasticizers and adhesives, and liquid condensation products of this type are therefore also included within the broad scope of the present invention. These liquid products have a tendency to harden slowly even under atmospheric conditions, and this fact makes them particularly valuable in adhesive applications.

While a feature of the invention consists in the manufacture of resins from cyclohexyl urea as the only urea constituent of the resinification reaction, resins formed by condensation of cyclohexyl urea with formaldehyde will be found to have higher melting points and increased hardness, in cases in which at least a certain small amount of unsubstituted urea is incorporated in the resinification reaction mixture.

The following examples will assist those skilled in the art in the practice of the invention:

Example I 25 parts of cyclohexyl urea, 25 parts of aqueous formaldehyde, and one part of 93% acetic acid were mixed together and boiled until the temperature reached 100° C. The reaction mixture was then cooled by adding water. The separated resin was washed several times with water, dissolved in isopropyl alcohol, and heated until the temperature reached 165° C.

The resulting clear resinous product had a melting point of 39° C. It was soluble in aromatic hydrocarbons and alcohols. It was compatible with drying oils and alkyd resins. Films obtained from varnishes employing the resin dried in contact with the atmosphere to a slightly tacky and semi-plastic condition.

Example II 37 parts of cyclohexyl urea were mixed with 40 parts of aqueous formaldehyde solution and 3 parts of 93% acetic acid. The resulting mixture was dissolved in 60 parts of isopropyl alcohol and heated until the temperature reached 100° C. 7 parts of urea in aqueous solution were then added to the intermediate condensation product so obtained, and heating was continued until the temperature reached 140° C.

The resulting resin had a melting point of 74.0° C., and other characteristics similar to those of Example I.

*Example III*

6 parts of urea were mixed with 35 parts of aqueous formaldehyde, one part of 93% acetic acid and 50 parts of butyl alcohol. The resulting mixture was heated until the temperature reached 100° C., and was then combined with 37 parts of cyclohexyl urea, which had been previously dissolved in 150 parts of isopropyl alcohol. Heating of the resulting mixture was continued until the resin reached 150° C., and was soluble in aromatic hydrocarbons.

The resulting resin had a melting point of 89.0° C., and was characterized by light, clear color, solubility in alcohols and aromatic hydrocarbons and compatibility with drying oils, alkyd resins and nitro-cellulose. Air dried films of the resin were tough and semi-plastic.

*Example IV*

Two separate reaction mixtures were made up as follows:

A

| | Parts |
|---|---|
| Cyclohexyl urea | 37 |
| Aqueous formaldehyde | 37 |
| 93% acetic acid | 1 |

B

| | |
|---|---|
| Urea | 15 |
| Aqueous formaldehyde | 83 |
| 93% acetic acid | 1 |

Mixture A was dissolved in 180 parts of isopropyl alcohol and heated until the temperature reached 100° C.

Mixture B was heated in the presence of 50 parts of butyl alcohol until the temperature reached 100° C. Mixtures A and B were then combined and heated until the resulting resinoid was found to be soluble in aromatic hydrocarbons.

The resin produced in this experiment had a melting point of 86.0° C. It was characterized by pale color, solubility in alcohols and aromatic hydrocarbons and compatibility with drying oils, alkyd resins and nitro-cellulose. Films of the resins dried in the atmosphere were semi-plastic.

*Example V*

57 parts of aqueous formaldehyde (37% concentration) were mixed with 3 parts of 93% acetic acid and heated until the temperature reached 98° C. 37 parts of cyclohexyl urea were then gradually added, the mixture being stirred during this addition, and stirring being continued until a clear liquid was obtained. A small amount of heat was applied to the mixture during the stage of condensation with the cyclohexyl urea described above, but it was unnecessary to apply very much external heat, since the reaction was, itself, exothermic, and very little heat was therefore required to maintain the temperature at the desired point of 98° C. After addition of the cyclohexyl urea was completed, heat was applied to the mixture until the temperature reached 145° C. The resulting condensation product was a viscous liquid at 145° C., and when it was cooled to room temperature, it became a tacky semi-solid, with a melting point of 49° C. (by ring and ball method). The product was characterized by thermo-plasticity, light color and stability. It was further characterized by infinite solubility in organic substances such as aromatic hydrocarbons and alcohols, compatibility with alkyd resins and with other types of resin. Air-dried films of the product were semi-plastic.

*Example VI*

57 parts of formaldehyde (37%) and 3 parts of acetic acid (93%) were heated together to 98° C., and 37 parts of cyclohexyl urea were added in the same manner discussed in Example V. 7 parts of an aqueous solution of urea were then added to the intermediate condensation product, and the heating was continued until the temperature reached 125° C. At this temperature, the condensation product was a viscous liquid. When cooled to room temperature it became a tacky semi-solid with a melting point of 68° C.

This resin was harder than that produced in Example V, but the characteristics of the resin were otherwise similar to those of the resin of Example V.

While the above discussion has not been applied specifically to thio-urea, I should like to point out that thio-urea derivatives having cyclohexyl substituents function very similarly to corresponding simple urea derivatives, in the practice of the present invention. The formation of resins and viscous liquid products by condensation of di-cyclohexyl urea with methylene-containing bodies is also within the broad scope of the invention.

Modifications will be obvious to those skilled in the art, and I do not therefore wish to be limited except by the scope of the sub-joined claims.

I claim:

1. Products formed by condensing with formaldehyde a mixture consisting of (1) a major proportion of a substance selected from the class consisting of cyclohexyl substitution products of urea and thio-urea and (2) a minor proportion of urea present in the condensation reaction in quantity sufficient to impart hardness to the final condensation product.

2. Process for forming condensation products of urea and derivatives thereof with formaldehyde that comprises condensing with formaldehyde a mixture consisting of (1) a major proportion of a substance selected from the class consisting of cyclohexyl substitution products of urea and thio-urea and (2) a minor proportion of urea present in the condensation reaction in quantity sufficient to impart hardness to the final condensation product.

3. Process for preparing condensation products of urea and derivatives thereof with formaldehyde that comprises condensing with formaldehyde both the substance urea and a substance selected from the class consisting of cyclohexyl derivatives of urea and thio-urea, one of the substances being reacted initially with formaldehyde to form an intermediate condensation product that is further condensed with the other substance to yield a final condensation product of both substances with formaldehyde.

4. A condensation product prepared by the process set forth in claim 3.

JOHN FRANK OLIN.